United States Patent [19]
Schroeder

[11] Patent Number: 5,370,267
[45] Date of Patent: Dec. 6, 1994

[54] METHOD AND APPARATUS FOR MEASURING DISPENSER USAGE

[75] Inventor: Wesley A. Schroeder, Seville, Ohio

[73] Assignee: GOJO Industries Inc., Cuyahoga Falls, Ohio

[21] Appl. No.: 130,767

[22] Filed: Oct. 4, 1993

[51] Int. Cl.⁵ .................................. B67B 7/00
[52] U.S. Cl. ............................ 222/1; 222/37; 222/38
[58] Field of Search .......... 222/36, 37, 38, 321, 222/638, 651, 1; 235/94 R

[56] References Cited

U.S. PATENT DOCUMENTS

| | | | |
|---|---|---|---|
| 3,119,557 | 1/1964 | Chapman | 222/38 X |
| 3,606,084 | 12/1969 | Morrone | 222/38 |
| 4,188,984 | 2/1980 | Lyall | 222/38 X |
| 4,265,370 | 5/1981 | Reilly | 222/37 X |
| 4,349,133 | 9/1982 | Christine | 222/183 |
| 4,394,938 | 7/1983 | Frassanito | 222/207 |
| 4,621,749 | 11/1986 | Kanfer | 222/153 |
| 4,715,517 | 12/1987 | Potter et al. | 222/181 |
| 4,765,515 | 8/1988 | Lippman | 222/162 |
| 4,774,916 | 10/1988 | Smith | 222/37 X |

Primary Examiner—Gregory L. Huson
Attorney, Agent, or Firm—Reese Taylor

[57] ABSTRACT

An apparatus and method of counting dispensing events or washes in a fluid dispenser in which an activator is moved from a starting position to a dispensing position and back to dispense material includes a counter which is indexable to record a dispensing event only after dispensing pressure is totally relieved from the activator for a predetermined period of time. The counter is activated by a resilient member which is compressed by the activator but delays its full return to its starting state until compression is totally removed for the predetermined period of time. Only after elapse of this period of time is the counter activated.

8 Claims, 3 Drawing Sheets

METHOD AND APPARATUS FOR MEASURING DISPENSER USAGE

FIELD OF THE INVENTION

This invention relates in general to fluid dispensing apparatus and relates in particular to a method and apparatus for measuring and recording the number of times the dispenser apparatus is used.

BACKGROUND OF THE INVENTION

There are a number of soap dispensers commercially available some of which are wall mounted and include a base adapted to be mounted against a wall or other vertical surface and a cover. The covers are generally hinged to the mounting base and so as to be capable of swinging to an open position to permit loading into the dispenser and to a closed and locked position for operation. In that regard, the soap is often sold in replaceable containers such as collapsible bags with a dispensing tube extending therefrom and having a dispensing nozzle on the projecting end.

Examples of such dispensers can be seen in Potter U.S. Pat. No. 4,715,517, Lippman U.S. Pat. No. 4,765,515 and Kanfer U.S. Pat. No. 4,621,749. This prior art discloses dispensers in which a push bar is secured either to the cover or to the base member so that upon engagement and actuation of the push bar by the hand of the user the dispensing tube containing the soap is collapsed so as to eject a predetermined portion through the dispensing nozzle at the end of the tube onto the hand of the user.

Another dispenser in this field can be seen in Kanfer U.S. Pat. No. 4,582,227 which discloses a pump type soap dispenser.

All of these dispensers are commonly located and used in many different environments. Particularly, however, they are often used in a hospital or restaurant setting wherein sanitation is of prime importance.

Various regulatory bodies have determined through experience that on average these sanitary requirements can be met if a predetermined number of hand washings per employee occur during a predetermined period of time such as an hour, a shift, etc. Thus, for example, if two parties are involved and the desired number of hand washings on average is ten per hour, the total number of hand washes involving the particular dispenser in an hour would be twenty.

The difficulty involved in measuring compliance with these various regulations and aspirational goals is that the user will often "pump" the dispenser. In other words, the user will often engage the push bar with his or her hand and depress it partially or fully and then maintain hand contact and repeat the depression movement several times. Therefore, if one is to simply measure the number of times that the pressure bar or push bar moves, one would record a number of hand washings in such an instance that would be, in fact, inaccurate.

Therefore, it has become apparent that it is desirable to be able to measure not the strokes of the push bar or other activating member but the number of individual hand washings or dispensing events which actually take place.

SUMMARY OF THE INVENTION

It has been found, therefore, that a measuring apparatus can be constructed which can be either removably or permanently inserted into a conventional dispensing unit of the type generally described above with a counter and means for delaying the actuation of the counter until the push bar or pressure member has been released for a predetermined period of time subsequent to a series of compression motions. For example, in the push bar type dispenser illustrated herein, the counter desirably will only register one "wash" when the push bar has been relieved of dispensing pressure and returned to a static position for a predetermined period after the stroke is completed.

Specifically, it has been found that the counter can be attached to a connecting arm which is in turn attached to a plunger. The plunger is positioned so as to be engaged by the push bar or pressure bar of the dispenser itself and depressed either partially or totally when the bar is activated. The plunger acts on a quantity of foam or other resilient means which, when pressure is removed from the plunger, such as by releasing the activating bar, the plunger will slowly return to its beginning or fully relaxed position and index the counter to measure one "washing" or dispensing event.

It has been found, however, that due to the built in delay of the return stroke of the plunger, if the user maintains contact with the push bar or pressure bar and "pumps" rapid strokes thereof, that the resilient member or foam, due to its inherent damping characteristic, will not be able to return the plunger to its original position and, therefore, will not be able to register one wash on the counter until the push bar has been released for a predetermined period of time.

Accordingly, production of a method and apparatus for measuring usage of a fluid dispenser of the character above described becomes the principal object of this invention with other objects thereof becoming more apparent upon a reading of the following brief specification considered and interpreted in view of the accompanying drawings.

BRIEF DESCRIPTION OF THE DRAWINGS

FIG. 4 is a front elevational view of the measuring apparatus.

BRIEF DESCRIPTION OF THE PREFERRED EMBODIMENTS

Figure 1:
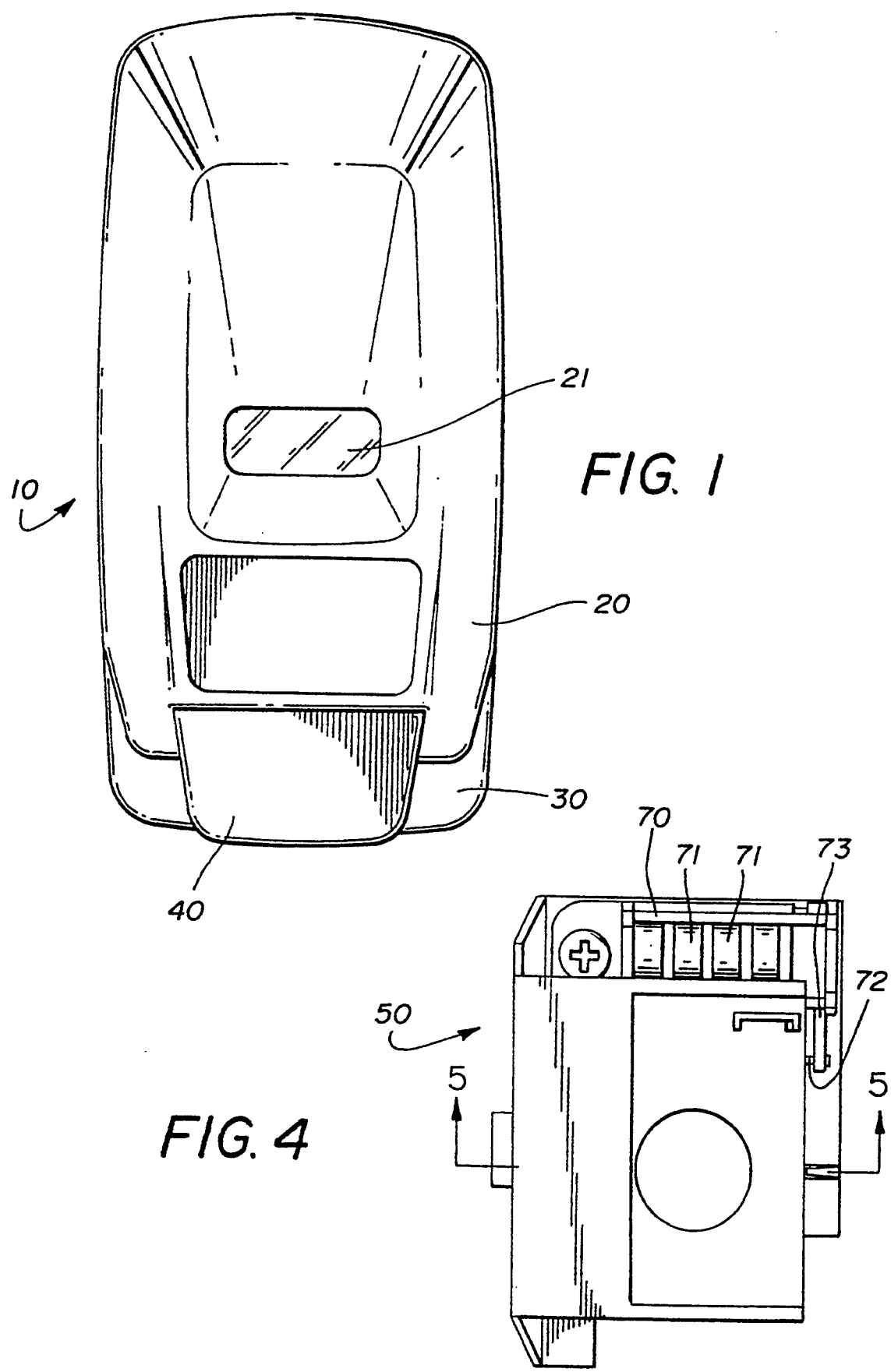
FIG. 1 is a front elevational view of a typical dispenser.

Referring first then to FIG. 1 of the drawings, it will be seen that the dispenser, generally indicated by the numeral 10, includes a cover 20 and a base plate or wall mounting plate 30. Also carried on the cover 20 is a push bar or pressure bar 40. This bar is capable of moving inwardly or from the left to the right of FIG. 2 of the drawings upon engagement by the hand of the user to engage and collapse tube 33.

Figure 2:
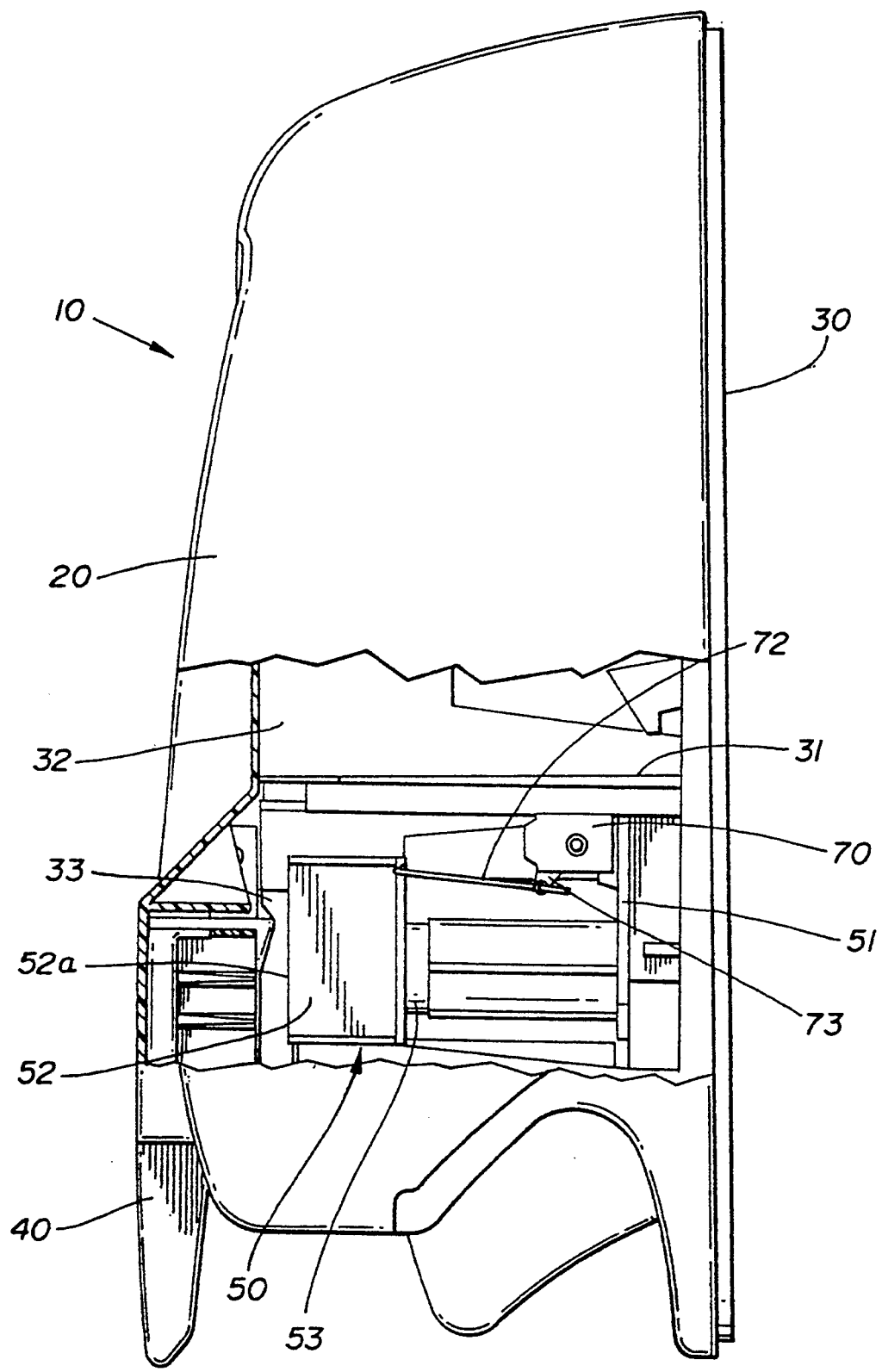
FIG. 2 is a side elevational view of the dispenser of FIG. 1 partially broken away and showing the measuring apparatus in place.
Figure 3:
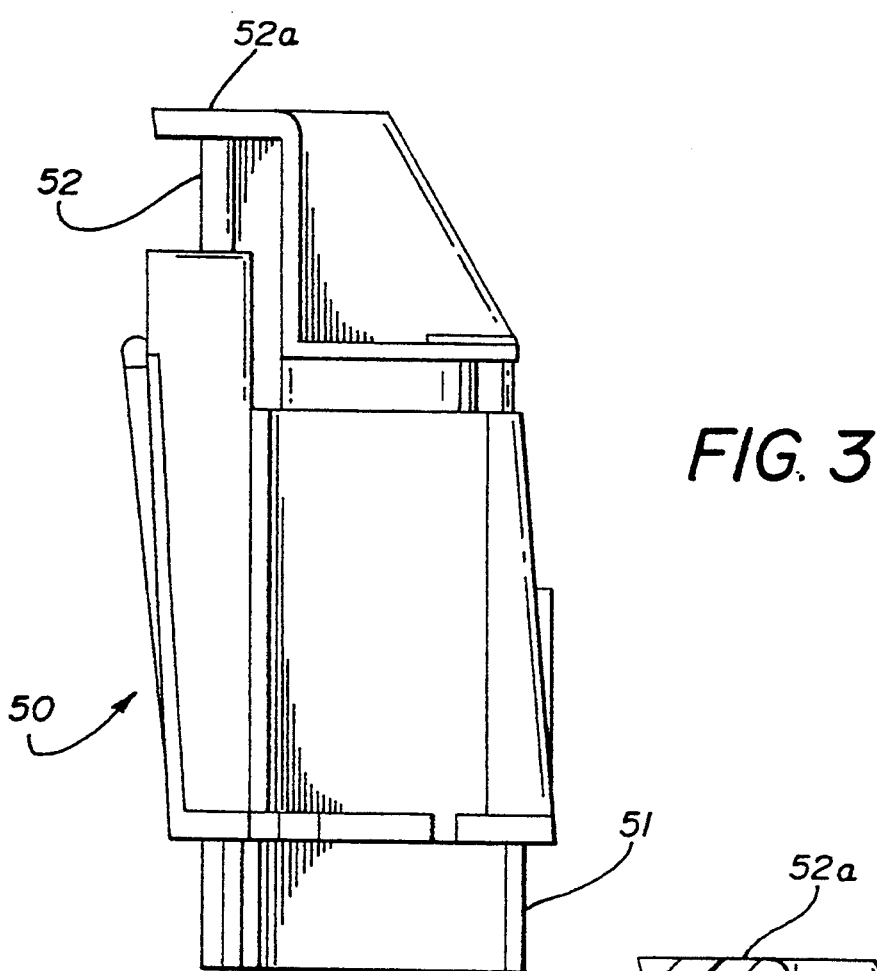
FIG. 3 is a bottom plan view of the measuring apparatus.
Figure 5:
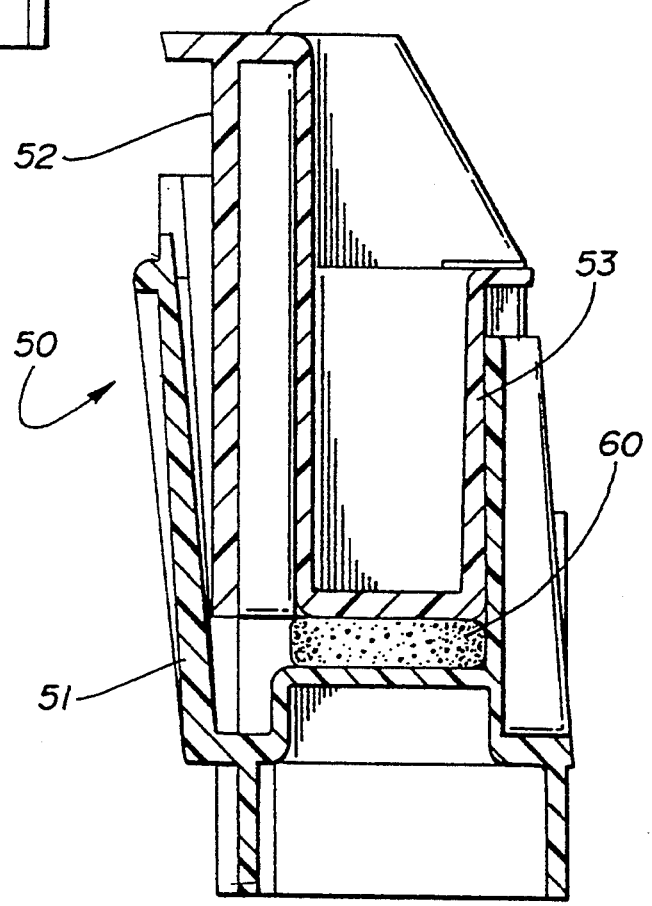
FIG. 5 is a top plan sectional view taken along the line 5—5 of FIG. 4, partially in section, of the measuring apparatus.

The base or wall mounting plate 30 has a shelf 31 which receives a container of the soap or other fluid being dispensed and generally indicated by the numeral 32 in FIG. 2. The tube 33 extends downwardly from container 32 and is engaged by the push bar 40 when it is moved to the right of FIG. 2. This will collapse the tube 33 and eject a predetermined measure of the soap or other material through a nozzle (not shown) at the bottom end of the tube. Assuming the user has engaged bar 40 with the heel of the hand, the soap will be deposited in the user's palm. This general principle of operation is well known in the art and is described in the patents cited above. It will be noted that in Kanfer U.S. Pat. No. 4,582,227 the dispensing impetus is downward rather than inward but the effect is similar. Therefore, while the invention is illustrated and described herein with reference to push bar type dispensers it is believed to be applicable to other types as well.

Referring next then to FIGS. 2 through 5 of the drawings for a description of the measuring apparatus, it will be seen that the measuring apparatus is generally indicated by the numeral 50 and includes a frame 51 which is generally tubular in cross section of configuration and also includes a subframe 52 which is movable relatively of the main frame 51.

One end of the subframe 52 has a surface 52a which serves as a contact point for engagement with the push bar or pressure bar 40 so that when the bar 40 is depressed to the right of FIG. 2 for example, the surface 52a will be engaged by the bar causing the subframe 52 to slide axially relatively of the main frame 51 toward base or wall mounting plate 30. The main frame 51 also carries a quantity of foam 60 which abuts against the bottom of the plunger 53, which is formed integrally with subframe 52, so that as the plunger 53 is moved for example to the right of FIG. 2 the foam 60 will be compressed. This foam, when compressive dispensing pressure is released, will attempt to urge the subframe 52 back to the starting position as will be described below.

The main frame 51 also carries a counter 70 bearing multiple indicia rolls 71,71. The counter 70 is of conventional design with the rolls 71,71 bearing numbers and being journalled on a shaft which can be indexed by movement of lever or actuator 73. A typical counter of this general type is the 1779 series inverse escapement drive counter available from Veeder-Root Digital Products of 125 Powder Forest Drive, Simebury, Conn. Such a counter 70 is connected to the moveable subframe 52 by an arm 72 extending between counter actuator 73 and the subframe as can be seen in FIG. 2 of the drawings.

It will be apparent then that upon movement of push bar or pressure bar 40 to the right of FIG. 2 contact will be made with the surface 52a of subframe 52. This will cause the subframe 52 and the plunger 53 to move to the right of FIG. 2. Simultaneously, connecting arm 72 will permit the internal spring of the counter to cock actuator 73. As mentioned previously, the foam 60 will then be compressed but the counter 70 will not be indexed to the next number until actuator 73 is returned to its starting position. It is only when pressure is released from the activator bar 40 for a predetermined period and the foam returns the subframe 52 to its beginning position that the actuator 73 will activate the counter 70 and record one wash by rotating one of the rolls 71.

It will be apparent, therefore, that with this arrangement even if the user "pumps" the push bar or pressure bar 40 before releasing it and completing the hand washing that the counter 70 will record only one "wash" inasmuch as the foam 60 will allow the counter to index only after the actuator has returned to its original position. That return is controlled by the foam 60 which builds in a delay. Thus, regardless of whether the user keeps his or her hand in contact and delivers a number of strokes or removes the hand and reengages the bar, there will be no count until the compression force on the foam has been released for a predetermined period.

It will be apparent that the predetermined lapse of time involved can be altered, in the form of the invention illustrated by simply altering the length of the foam 60. Therefore, periodic review of the reading on the counter will enable one to ascertain the total number of washes in a given period of time.

While a full and complete description of the invention has been set forth in accordance with the dictates of the Patent Statutes, it should be understood that modifications can be resorted to without departing from the spirit hereof or the scope of the appended claims.

For example, the invention has been described in the context of hand washing and soap dispensers associated therewith. However, it is believed apparent that the measuring function could be readily adapted to dispensers which dispense material other than soap, if so desired.

Furthermore, certain representative patents have been referred to herein to show the general type of dispenser involved. These patents illustrate dispensers which are activated by pushing the bar toward the mounting surface. There are others such as Christine U.S. Pat. No. 4,349,133 and Frassanito U.S. Pat. No. 4,394,938 which are actuated by pulling a similar bar away from the mounting surface, and it is believed that the principle of this invention would have equal utility in that arrangement as well.

Finally, while a foam 60 has been illustrated and described as the medium for returning the plunger to its starting position and thus registering a wash on counter 70, it is believed apparent that other resilient motion or sensing, delay means could be employed. Merely by way of example, a dashpot or electronic means could be employed.

What is claimed is:

1. Apparatus for measuring the usage of a fluid dispenser which is actuated by pressure on an activating member which, in turn, triggers the discharge of material from the dispenser upon movement of the activating member from a starting position to a dispensing position and back to the starting position, comprising:
    a) a measuring apparatus attached to the dispenser and engagable by the activating member upon actuation thereof;
    b) recording means carried by said measuring apparatus;
    c) moveable actuating means carried by said measuring apparatus connected to said recording means; and
    d) said recording means recording one cycle of use after the activating member and said moveable actuating means have returned to the starting position and then only after a predetermined lapse of time.

2. The apparatus of claim 1 wherein said recording means includes a counter; said counter being indexed only upon the return of the activating member and said moveable actuating means to their starting position and a predetermined lapse of time.

3. The apparatus of claim 1 wherein said moveable actuating means includes a plunger moveable by the activating member; and compressible resilient means supporting said plunger and normally urging said plunger toward the activating member; said compressible resilient member controlling the duration of return of said plunger.

4. The apparatus of claim 3 wherein said resilient means is foam.

5. The apparatus of claim 3 wherein said recording means are connected to said plunger.

6. The apparatus of claim 4 wherein said recording means include an actuator arm for indexing said recording means; said actuator arm being connected to said plunger and moveable to index said recording means following return of the activating member and said plunger to their starting position and a predetermined lapse of time.

7. A method of measuring the number of usages of a liquid dispenser in which a charge of material is emitted upon the movement of an activating member against a dispensing member comprising the steps of:
   a) actuating a counter by movement of the activating member toward the dispensing member and engaging a moveable actuating means and returning the activating member to its starting position; and
   b) recording a dispensing event only after return of the activating member and the moveable actuating means to their starting position and then after a predetermined lapse of time.

8. The method of claim 7 wherein the moveable actuating means includes a plunger connected to a recorder and supported by resilient means for returning the plunger to its starting position to activate the recorder upon release of the activating member,

* * * * *

UNITED STATES PATENT AND TRADEMARK OFFICE
CERTIFICATE OF CORRECTION

PATENT NO. : 5,370,267
DATED : December 6, 1994
INVENTOR(S) : Wesley A. Schroeder It is certified that error appears in the above-identified patent and that said Letters Patent is hereby corrected as shown below:

In Column 4, line 54, between the words "apparatus" and "connected" insert the word ---and---.

Signed and Sealed this

Twenty-first Day of March, 1995

Attest:

BRUCE LEHMAN

*Attesting Officer*      *Commissioner of Patents and Trademarks*